C. H. BROWN, C. L. SWARTOUT & M. J. FITZGERALD.
GLARE SHIELD FOR VEHICLES.
APPLICATION FILED DEC. 1, 1913.
1,097,295.
Patented May 19, 1914.
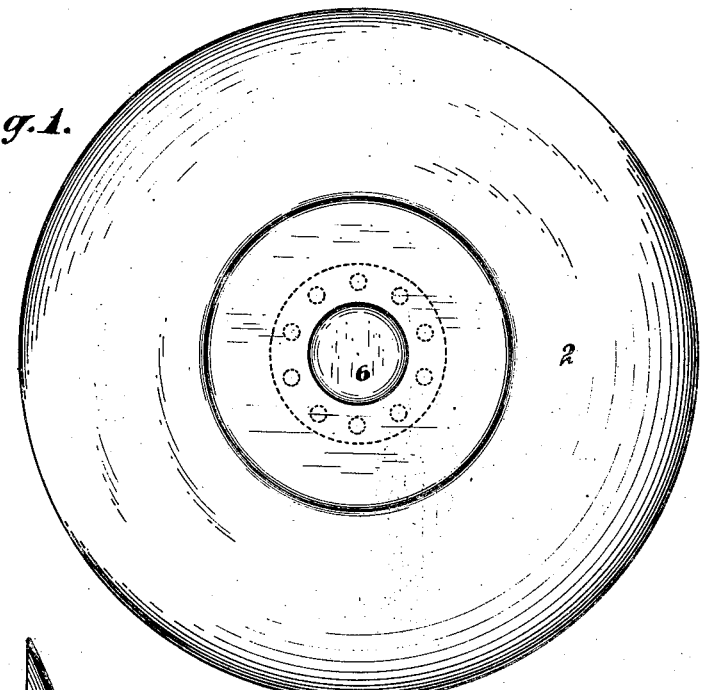
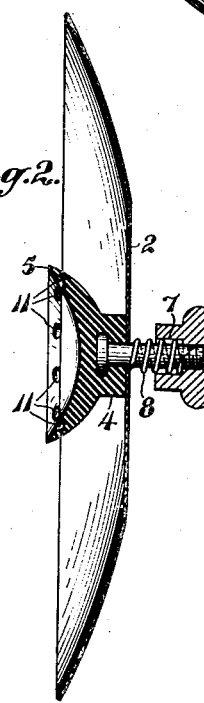
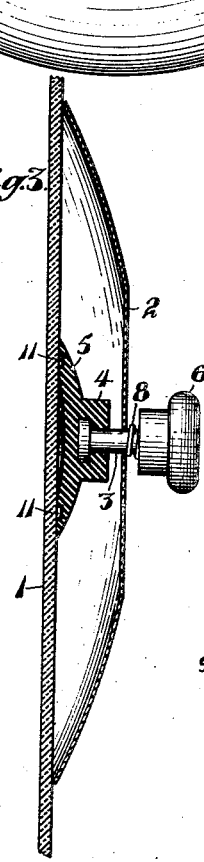
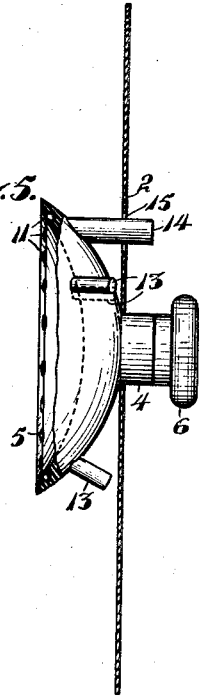
WITNESSES:
P. C. Gliedner
G. M. Ball
INVENTORS,
Charles H. Brown
Charles L. Swartout
Michael J. Fitzgerald
BY Francis M. Wright,
ATTORNEY

UNITED STATES PATENT OFFICE.

CHARLES H. BROWN, CHARLES L. SWARTOUT, AND MICHAEL J. FITZGERALD, OF RICHMOND, CALIFORNIA.

GLARE-SHIELD FOR VEHICLES.

1,097,295.  Specification of Letters Patent.  Patented May 19, 1914.

Application filed December 1, 1913. Serial No. 803,924.

*To all whom it may concern:*

Be it known that we, CHARLES H. BROWN, CHARLES L. SWARTOUT, and MICHAEL J. FITZGERALD, citizens of the United States, and residing at Richmond, in the county of Contra Costa and State of California, have invented new and useful Improvements in Glare-Shields for Vehicles, of which the following is a specification.

The object of the present invention is to provide an improved device for shielding the eyes of a driver of an automobile, street car, or locomotive at night time from the glare of the head light of an approaching automobile, street car or locomotive, so that said driver can see to properly direct the vehicle.

In the accompanying drawing: Figure 1 is a rear view of our improved glare shield;
Fig. 2 is a diametrical section thereof; Fig. 3 is a view similar to Fig. 2, but showing the device attached to a wind shield; Fig. 4 is an enlarged detail side view of a spring; Fig. 5 is a sectional view of a modification of the invention.

Referring to the drawing, 1 indicates a glass plate, such as the glass wind shield of an automobile, or the window of a street car or locomotive, to which our invention is adapted to be applied. Said invention comprises a disk 2 of an approximately saucer-shaped form, and of thin sheet metal. Said disk is formed with a small central aperture through which extends a screw 3, the head of which, on the concave side of the disk, is embedded in a boss 4 on the back of a rubber suction cup 5. On the threaded end of said screw, on the convex side of said disk, is screwed a knob 6, having at its inner end a central recess 7 of larger diameter than the screw. Within said recess 7 is received one end of a coiled spring 8 coiled around said screw, the other end abutting against the back of the disk. The spring 8, pressing at one end against the rear of the disk, and at the other end against the knob, presses the edge of the disk against the surface to which it is applied, and adds to the resiliency of the rubber in raising the central portion of the suction cup from the glass surface, and thus increases the suction in said cup. To form the ends of the spring the wire is cut across at a very acute angle, thus causing said ends to terminate in sharp points 9, as shown in Fig. 4. The spring is coiled in a left-handed direction, and its sharp ends cut or bite into the knob 6 and the soft iron of the disk 2 respectively and thus the spring serves as a nut-lock to prevent the unscrewing of the knob.

In order to increase the adhesion of the suction cup to the glass wind shield, its inner surface at its marginal portion, makes a very small angle with a plane surface through the edge or at right angles to the axis of the cup. Said margin so inclined is of considerable width, and when the suction cup is pressed against the glass surface, as shown in Fig. 3, the whole of said marginal surface will be in contact with the surface to which it is applied. The ordinary form of suction cup has a sharp edge, and therefore should there be on the surface to which the edge of the suction cup is applied a minute particle of dust, even too small to be seen except by the aid of a microscope, then air will flow in a minute current beneath said edge at the sides of said particle, and in a short time there will be no longer a vacuum in said cup. With the present form of suction cup here shown such action does not take place, for said marginal portion is sufficiently wide to envelop a single particle, or a small number of particles, so that there is no continuous passage for the air around said particles and beneath the rubber margin of the suction cup.

We also form in the marginal portion of the suction cup a circumferential series of small pockets 11. When the suction cup is pressed into place, any particles of dust which lie on the glass surface adjacent to a pocket are driven by the pressure of the air into the pocket. The pressure on the air in the pockets causes the moisture therein to be condensed, and thus assists in sealing the suction cup.

In the modification of the invention shown in Fig. 5, the suction cup is made somewhat larger than in the form of the invention shown in Fig. 1, and the boss 4 extends through the central hole in the disk, which is herein shown as plane, and the spring 8 is omitted. The suction cup is formed to provide, extending from its back, three equidistant lugs 13, and a fourth considerably longer lug 14. When the suction cup is in use the ends of the three lugs 13 contact with the inner surface of the disk, and prevent rattling of its edge against the glass surface of the glass wind shield. The fourth longer lug 14 extends through a hole 15 in the disk and can be seized at the back, to pull away a side of the suction cup to be detached.

We claim:—

1. A glare shield for vehicles comprising a disk, a suction cup on said disk, a screw the head of which is secured to said suction cup and which projects through a hole in said disk, a device screwed on the outer end of said screw, and a spring coiled around said screw, of which one end abuts against said device and the other end against the outer side of the disk.

2. A glare shield for vehicles comprising a disk, a suction cup on said disk, a screw the head of which is secured to said suction cup and which projects through a hole in said disk, a knob screwed to the outer end of said screw and having at its inner end an enlarged recess, a spring, coiled around said screw, of which one end abuts against said disk, and the other end is received in said recess.

3. A glare shield for vehicles comprising a disk, a suction cup on said disk, a screw the head of which is secured to said suction cup and which projects through a hole in said disk, a knob screwed to the outer end of said screw, a spring, coiled around said screw, of which one end is sharp and abuts against said disk, and the other end is sharp and presses against said knob.

4. A glare shield for vehicles comprising a concavo-convex disk, a suction cup located centrally on the concave portion of said disk, a screw the head of which is secured to said suction cup and which projects through a central hole in said disk, a device screwed on the outer end of said screw, and a spring coiled around said screw, of which one end abuts against said device and the other end against the convex side of the disk, said suction cup being of such height relatively to the disk that when the suction cup is pressed against a plane surface the edge of the disk also contacts with said surface.

5. A glare shield for vehicles comprising a disk, a suction cup on said disk, a stem secured to said suction cup and projecting through a hole in said disk, a device on the outer end of said stem, and a spring coiled around said stem, one end of which abuts against said device and the other end against the disk, the marginal portion of the inner surface of said suction cup being inclined at a small angle to the plane of the edge of the cup, whereby, when the cup is pressed against a plane surface, the whole of said marginal portion is in contact with said plane surface throughout its full width.

6. A glare shield for vehicles comprising a disk, a suction cup on said disk, a stem secured to said suction cup and projecting through a hole in said disk, a device on the outer end of said stem, and a spring coiled around said stem, one end of which abuts against said device and the other end against the disk, the marginal portion of the inner surface of said suction cup having a circumferential series of pockets.

In testimony whereof we have hereunto set our hands in the presence of two subscribing witnesses.

CHARLES H. BROWN.
CHARLES L. SWARTOUT.
MICHAEL J. FITZGERALD.

Witnesses:
I. N. GATES,
V. YARBROUGH.